(12) United States Patent
Jiao et al.

(10) Patent No.: US 8,588,087 B2
(45) Date of Patent: Nov. 19, 2013

(54) METHOD FOR POSITIONING MOBILE DEVICES AND APPARATUS FOR POSITIONING MOBILE DEVICES

(75) Inventors: Wenhua Jiao, Shanghai (CN); Pin Jiang, Shanghai (CN); Yuanyuan Ma, Shanghai (CN); Ruoju Liu, Shanghai (CN)

(73) Assignee: Alcatel Lucent, Paris (FR)

( * ) Notice: Subject to any disclaimer, the term of this patent is extended or adjusted under 35 U.S.C. 154(b) by 322 days.

(21) Appl. No.: 12/864,411

(22) PCT Filed: Jan. 29, 2008

(86) PCT No.: PCT/CN2008/000216
§ 371 (c)(1),
(2), (4) Date: Oct. 11, 2010

(87) PCT Pub. No.: WO2009/100562
PCT Pub. Date: Aug. 20, 2009

(65) Prior Publication Data
US 2011/0019567 A1    Jan. 27, 2011

(51) Int. Cl.
*H04L 12/26* (2006.01)
(52) U.S. Cl.
USPC .......................... 370/252; 370/210; 370/335
(58) Field of Classification Search
None
See application file for complete search history.

(56) References Cited

U.S. PATENT DOCUMENTS

| | | | | |
|---|---|---|---|---|
| 5,365,516 A * | 11/1994 | Jandrell | ........................ | 370/335 |
| 5,907,809 A * | 5/1999 | Molnar et al. | ............. | 455/456.2 |
| 6,023,733 A * | 2/2000 | Periasamy et al. | ............ | 709/241 |
| 6,490,456 B1 * | 12/2002 | Bogdan et al. | ............. | 455/456.1 |
| 6,526,039 B1 * | 2/2003 | Dahlman et al. | .............. | 370/350 |
| 7,570,962 B2 * | 8/2009 | Chou | ......................... | 455/456.5 |
| 2004/0208142 A1 * | 10/2004 | Saw | ............................... | 370/328 |
| 2005/0058058 A1 * | 3/2005 | Cho et al. | ...................... | 370/208 |
| 2008/0014960 A1 | 1/2008 | Chou | | |

FOREIGN PATENT DOCUMENTS

| | | |
|---|---|---|
| CN | 1185897 C | 1/2005 |
| CN | 1719934 A | 1/2006 |
| CN | 101052214 A | 10/2007 |

OTHER PUBLICATIONS

International Search Report for PCT/CN2008/000216.
B.T. Fang, "Simple solutions for hyperbolic and related position fixes",IEEE Trans. Aerosp. Electron Syst., vol. 26, Sep. 1990, pp. 748-753.
Y.T. Chan et al., "A Simple and Efficient Estimator for Hyperbolic Location", IEEE Transactions on Signal Processing, vol. 42, No. 8, 1994, pp. 1905-1915.

(Continued)

*Primary Examiner* — Hassan Kizou
*Assistant Examiner* — Tejis Daya
(74) *Attorney, Agent, or Firm* — Fay Sharpe LLP

(57) ABSTRACT

The present invention relates to a mobile communication field. The present invention provides a method and an apparatus for WiMAX positioning by downlink preamble fast detection DPFD. The method comprises steps of: Mobile user station MSS detects downlink preambles from BSs, all of which are synchronized by in TDD mode mobile WiMAX; the TDoA of different BSs' preamble is get through preamble-based synchronization detection; and the exact location is calculated through classical TDoA algorithms. The embodiment of the present invention describes a novel concept for measuring the position of the mobile user equipment by the uplink ranging assistant downlink preamble detection. With the mobile WiMAX is accepted as a 3G standard by ITU and widely populated, the position based on WiMAX will be a market-potential service.

23 Claims, 14 Drawing Sheets

(56) References Cited

OTHER PUBLICATIONS

M.P. Wylie et al., "The None-Line-of-Sight Problems in Mobile Location Estimation", WINLAB TR-121, Jun. 199, pp. 827-831.

Hyoungsoo Lim, "Standardization and Specifications of WiBro PHY", Electronics and Telecommunications Research Institute, Jul. 13, 2005, 101 pp.

IEEE Std. 802.16.2-2004, IEEE Recommended Practice for Local and metropolitan area networks, "Coexistence of Fixed Broadband Wireless Access Systems", IEEE Computer Society and the IEEE Microwave Theory and Techniques Society, Mar. 17, 2004, 171 pp.

IEEE Std. 802.16e-2005 and IEEE Std. 802-16/2004/Cor 1-2005, IEEE Standard for Local and Metropolitan Area Networks Part 16: Air Interface for Fixed and Mobile Broadband Wireless Access Systems, Amendment 2: Physical and Medium Access Control Layers for Combined Fixed and Mobile Operation in Licensed Bands and Corrigendum 1, Mar. 6, 2006, pp. 44-172.

\* cited by examiner

METHOD FOR POSITIONING MOBILE DEVICES AND APPARATUS FOR POSITIONING MOBILE DEVICES

FIELD OF THE INVENTION

The present invention relates to the mobile communication field, in particularly relates to mobile WiMAX (Worldwide Interoperability for Microwave Access) field, and more particularly relates to a method for positioning mobile devices and an apparatus for positioning mobile devices in the mobile WiMAX system.

BACKGROUND OF THE INVENTION

Positioning can make a mobile device either gather the information about its position or provide accurate particular position. This technology brings forward many novel concepts and services, including location-sensitive billing, fleet tracking, package and personal tracking, mobile yellow pages, location-based messaging, route guidance, and providing traffic information. Positioning has already been applied in GSM and 3G networks, and it will be one of the most promising and important features of the next generation wireless systems.

WiMAX system is based on technologies of IEEE 802.16 family of standards, sponsored by an industry consortium called WiMAX Forum. The IEEE 802.16 family of standards specifies the air interface of fixed and mobile broadband wireless access (BWA) systems that support multimedia services. IEEE 802.16-2004 standard, which was also previously called 802.16d or 802.16-REVd, was published for fixed access in October 2004, cf. "IEEE Standard for Local and metropolitan area networks. Part 16: Air Interface for Fixed Broadband Wireless Access Systems", IEEE 802.16e. And the standard has now been updated and extended to 802.16e standard for mobile access, mobile WiMAX. Therefore, mobile WiMAX is one popular candidate platform to provide these services introduced by positioning. With the introduction of new Position Computation Service (PCS) service providers in the mobile WiMAX market, increased competition is expected between service providers to attract customers. However, to the best of our knowledge, there is no feasible solution for mobile WiMAX positioning.

The most widely employed location technologies are radio location systems that attempt to locate a Mobile Station (MS) by measuring radio signals between the MS and a set of BSs. Radio location systems can be based on signal strength, angle of arrival (AoA), time of arrival (ToA), time difference of arrival (TDoA) or their combinations. And it can be classified as two approaches: network-based and terminal-based. For network-based approach. BSs measure the signals transmitted by MS and relay them to a central site for processing, while for terminal-based approach. MS uses signals transmitted by BSs to calculate its own position. Several known positioning methods will be described there below.

Known Approach 1: GPS

The Global Positioning System (GPS) is a satellite-based navigation system made up of a network of 24 satellites placed into orbit by the U.S. Department of Defense. A GPS receiver must be locked on to the signal of at least three satellites to calculate a 2D position (latitude and longitude) and track movement. With four or more satellites in view, the receiver can determine the user's 3D position (latitude, longitude and altitude). GPS is based on ToA technology and needs line-of-sight (LOS) propagation of satellite signals. Unfortunately, it is not feasible to let every MS have GPS functionality. Therefore, the GPS based technology is out of scope of this proposal.

Known Approach 2: Signal Strength

Radio location using signal strength is a well known location method that uses a known mathematical model describing the path loss attenuation with distance. Since a measurement of signal strength provides distance estimation between MS and BS, the MS will lie on a circle centered at the BS. By using multiple BSs, the location of the MS can be determined.

For signal strength based location systems, the primary source of error is multipath fading and shadowing. Variations in the signal strength can be as great as 30-40 dB over distances in the order of a half wavelength. Signal strength can be indicated by Receive Signal Strength Indicator (RSSI). And MS can obtain an RSSI measurement from the downlink burst preambles. From a succession of RSSI measurements, the MS shall derive and update estimations of the mean and the standard deviation of the RSSI, and report them via REP-RSP messages. But since RSSI is a quantized value, many errors are still introduced. In summary, there is rarely application scenario of signal strength positioning approach in cell based mobile networks.

Known Approach 3: AoA

AoA technique estimates the MS location by first measuring the angles of arrival of a signal from a MS at several BSs through the use of antenna arrays. But in the absence of a LoS signal component, the antenna array will lock-on to a reflected signal that may not be coming from the direction of the MS. Even if a LoS component is present, multipath will still interfere with the angle measurement. It needs 8 antennas in the BS when array antennas being used, it increases the engineering difficulty. Because the array antenna is not suitable for the NLoS, mobile WiMAX usually does not employ the array antenna technique.

Known Approach 4: Time-Based Approach: ToA and TDoA

The time-based approach is based on estimating the ToAs or TDoA of a signal transmitted by MS and received at multiple BSs or the TDoAs or ToA of a signal received at multiple BSs by MS. In the ToA approach, the distance between MS and BS is measured by finding the one way propagation time between the MS and the BS. Geometrically, this provides a circle, centered at the BS, on which the MS must lie, i.e. the radius of the circuit is the distance between MS and BS. By using at least three BSs to resolve ambiguities, the MS's position is given by the intersection of the circles. FIG. 1 shows the ToA positioning method. As shown in FIG. 1, the distance between MS and BS1. BS2 and BS3 are R1, R2 and R3, respectively. According the definition above described, MS must lie on the circles centered at BS1, BS2 and BS3 respectively and the radius of which are R1, R2 and R3, so the point of the intersection of the three circles is the MS's position.

In the TDoA approach, differences in the times of arrival are used. Since the hyperbola is a curve of constant time difference of arrival of two BSs, the time differences define hyperbolas with focus at the BSs, on which the MS must lie. Hence, the location of the MS is at the intersection of the hyperbolas. FIG. 2 shows the TDoA positioning method. As shown in FIG. 2, the solid line is the hyperbola, the focus of which is at BS1 and BS3, and the constant time difference of which is the distance difference between the distance from MS to BS1 and the distance from MS to BS3, (R1-R3). The dotted line is the hyperbola, the focus of which is at BS1 and BS2, and the constant time difference of which is the distance difference between the distance from MS to BS1 and the distance from MS to BS2 (R1-R2). According to the definition above described, MS must lie at the point of intersection of the solid line hyperbola and the dotted line hyperbola.

It should be noted that LoS propagation conditions are still necessary to achieve high accuracy for the time-based method. However, it is not so sensitive for ToA and TDoA compared with other methodologies such as AoA and signal strength. What's more, there are many papers and proposals on how to tell NLOS from LOS such as Wylie's estimation 1 "The None-Line-of-Sight Problems in Mobile Location Estimation", IEEE Trans. Aerosp. Electron. Syst. Vol 16, pages 748-753. Therefore, in the rest of the present invention, we will propose how to apply TDoA for mobile WiMAX system.

SUMMARY OF THE INVENTION

The present invention provides a method for WiMAX positioning by downlink preamble fast detection DPFD, comprising steps of: Mobile user station MSS detects downlink preambles from BSs, all of which are synchronized by mobile WiMAX in TDD mode; the TDoA of different BSs' preamble can be gotten by preamble-based synchronization detection; and exact location can be calculated through classical TDoA algorithms.

Preferably, if there are less than three preambles detected in the preamble fast detection, an Uplink Ranging Assistant detection (URAD) approach is performed to provide assistant data to perform ranging. Wherein, the measurement signaling using MAC management message is used to do ranging. The MSS do ranging with the serving/anchor BS to get additional delay measurements for TDoA calculation in the URAD method. In the case that there are two possible roots for one round trip delay (RTD), the cell ID or sector ID information is used to choose one accurate root for the cell/sector. And in the case that there are two possible roots for one round trip delay (RTD), if the two roots are at the same cell/sector, the middle point of the two roots is chosen as the estimated position.

Preferably, after the downlink synchronization and uplink transmission parameters are acquired, the MSS transmits randomly selected Ranging code in a randomly selected Ranging Slot from available Ranging Region.

Preferably, after the BS receives the Ranging Code, it will send RNG-RSP message with Time Corrections and the delay measurement will be gotten simultaneously.

Preferably, the single/round trip delay can be obtained by BS when either initial ranging or periodical ranging happens, and the BS stores such a delay, (i.e. latest updated value, in its memory and sends it to the location computation server along with the one time offset when two preambles detected in MSS.

Preferably, the neighbor information carried by MOB_NBR-ADV is used to reduce the search range of the possible anchor Bs to decrease the neighbor BSs' preamble detection time.

Preferably, the preamble designed for OFDMA PHY in IEEE 802.16e is modulated using a boosted BPSK modulation with a specific Pseudo-Noise (PN) code.

Preferably, the moving-window based preamble detection is used for TDoA detection. Said TDoA detection comprises steps of: Moving one sample chip; FFT converting; and correlating with the neighbor BS preamble by the local candidate preamble series.

Preferably, if many NLoS preambles and two LoS ones are detected, the Wylie identification method is used to identify which signal is NLoS; and the two LoS signals as well as uplink ranging information are used to calculate location through said URAD-TDoA approach.

Preferably, if only one LoS preamble is detected or only one LoS is reconstructed from NLoS signals, uplink ranging assistant cell/sector ID approach is used.

Preferably, for the cases that only one LOS preamble is detected, the ranging information is used to obtain a circle whose diameter is the RTD; and the cell ID and sector ID are used to assist positioning. The middle of the arc in the sector is used as the estimated positioning.

Preferably, some messages are added to the CSN side for positioning service initiation request and result report to complete the whole process of a positioning service procedure. Said messages include LOC_REQ, LOC_RSP, LOC_ENQ message.

The present invention further provides an apparatus for mobile WiMAX positioning, comprising of the following components: a PHY layer module, for performing time difference detection in MSS; a MAC layer module, for performing certain signaling and providing conditions for the channel measurement according to positioning request from application layer; and an application layer module, for performing positioning or optional velocity computation based on measurements.

Preferably, said MSS reports the time difference to the current service/anchor base station by MOB_SCN-RSP message.

Preferably, said condition for the channel measurement is idle period.

Preferably, positioning algorithm is embedded in the location computation server in CSN.

Preferably, positioning algorithm is embedded in location related application of MSS.

Preferably, assume is made that a location computation server with positioning algorithm is a mandatory part for all positioning based services in mobile WiMAX.

The Beneficial Effect

The embodiments of the present invention provide a novel method to measure the location of mobile user equipment by using Uplink Ranging Assistant Downlink preamble detection. The present invention is the first one in the mobile WiMAX so far. As the mobile WiMAX is accepted as the 3G standards by the ITU and populated cosmically, the positioning based on WiMAX is a service with a market potential.

DETAILED DESCRIPTION OF PREFERRED EMBODIMENTS

Figure 1:
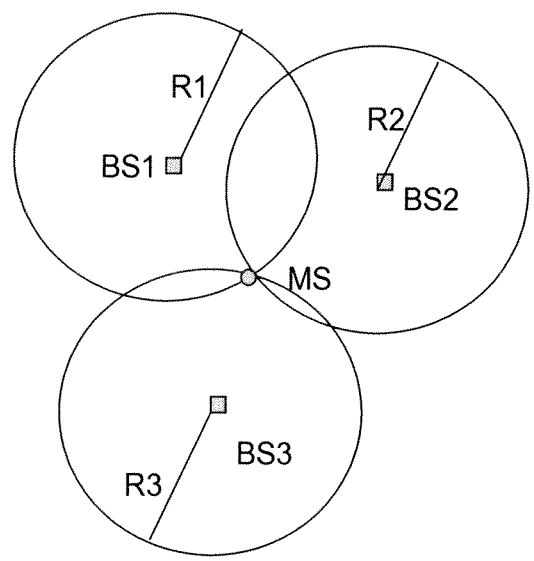
FIG. 1 shows a schematic view of ToA positioning method.
Figure 2:
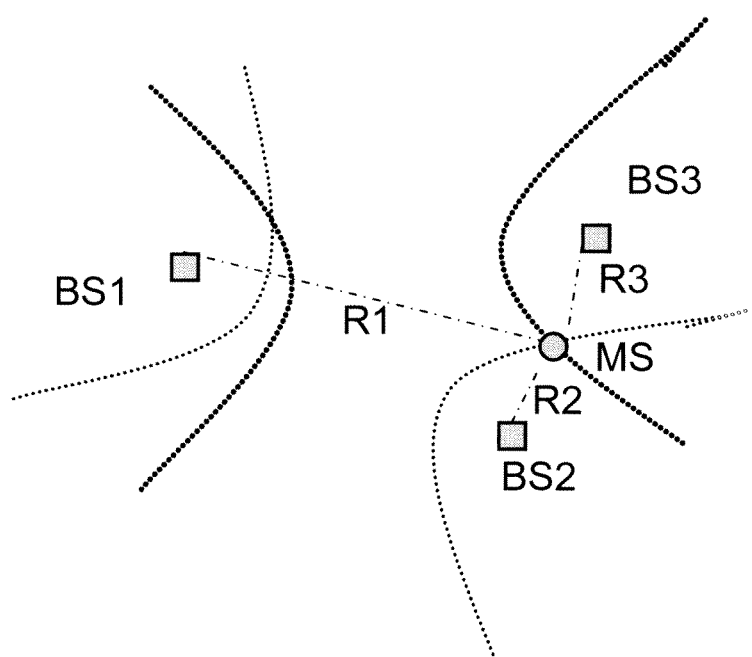
FIG. 2 shows a schematic view of TDoA positioning method.

Now, the preferred embodiments of the present invention will be described by referring to the drawings, the example of which is illustrated in the drawings. Throughout the drawings, the same number denotes the same element. The following embodiments will be described by reference to the accompanying drawings for the purpose of explaining the present invention.

1) Mobile WiMAX Frame Structure

Figure 3:
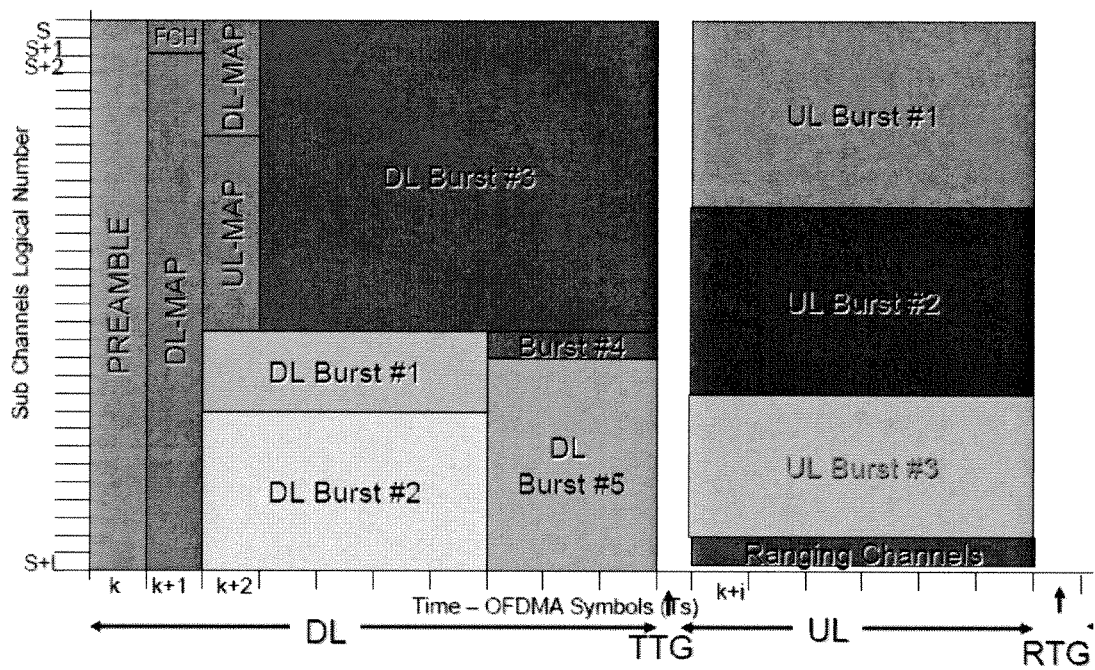
FIG. 3 shows an example of mobile WiMAX TDD frame structure.

Mobile WiMAX systems can support time-division duplexing (TDD) and frequency-division duplexing (FDD). This proposal of the present invention mainly concentrates on TDD mode, whose physical layer is based on Orthogonal Frequency Division Multiple Access (OFDMA) technology with at least Fast BS Switching (FBSS) handoff ability. An example of such system is WiBro, which is currently compatible with the 802.16e standard and has been launched commercially by two Korean operators in 2006. FIG. 3 shows an example of a mobile WiMAX TDD frame structure using OFDMA.

As shown in FIG. 3, the frame structure consists of the following: a preamble in the first Orthogonal Frequency Division Multiplexing (OFDM) symbol, FCH with fixed size for resource allocation of the DL PUSC zone and DL_MAP, DL_MAP and UL_MAP messages for resource allocation of DL and UL data bursts. DL/UL data bursts for data or control messages, and UL control channels for ranging, UL acknowledgment (ACK), and CQI feedback. Preamble and uplink ranging are used in the proposed URAD-TDoA scheme of the present invention. Note that for WiBro, the first three OFDMA symbol in uplink is reserved for ranging in accordance with Hyoungsoo Lim, "Standardization Standardization and Specifications of WiBro PHY, TTAS.KO-06.0064R1, released on Dec. 6, 2004. But the proposed uplink CDMA ranging code detection method is still valid for mobile WiMAX frame format shown in FIG. 3 as well as that of WiBro.

Mobile WiMAX usually employs frequency-division in the frequency-division duplexing of a village, so that it is impossible for a plurality of BS to receive the signal from one MS. When TDoA is used in the mobile WiMAX, the signal of a plurality of BS should be measured by mobile station (MS). The precondition of a positioning method for multiple signal sources is the synchronization of the multiple signal sources. Because of employing OFDMA and TDD, it often synchronizes the BS by GPS receiver in IEEE 802.16e, the precision of which is in order of ns. Different from the synchronization of BS in WCDMA, it makes it possible for the positioning on the basis of preambles, because of the high precision synchronization of the BS in the mobile WiMAX system. The mobile WiMAX system will use a wider bandwidth (10 Mhz, 20 Mhz), making it have smaller temporal resolution to position more precisely.

2) Mobile WiMAX Positioning Architecture

Figure 4:
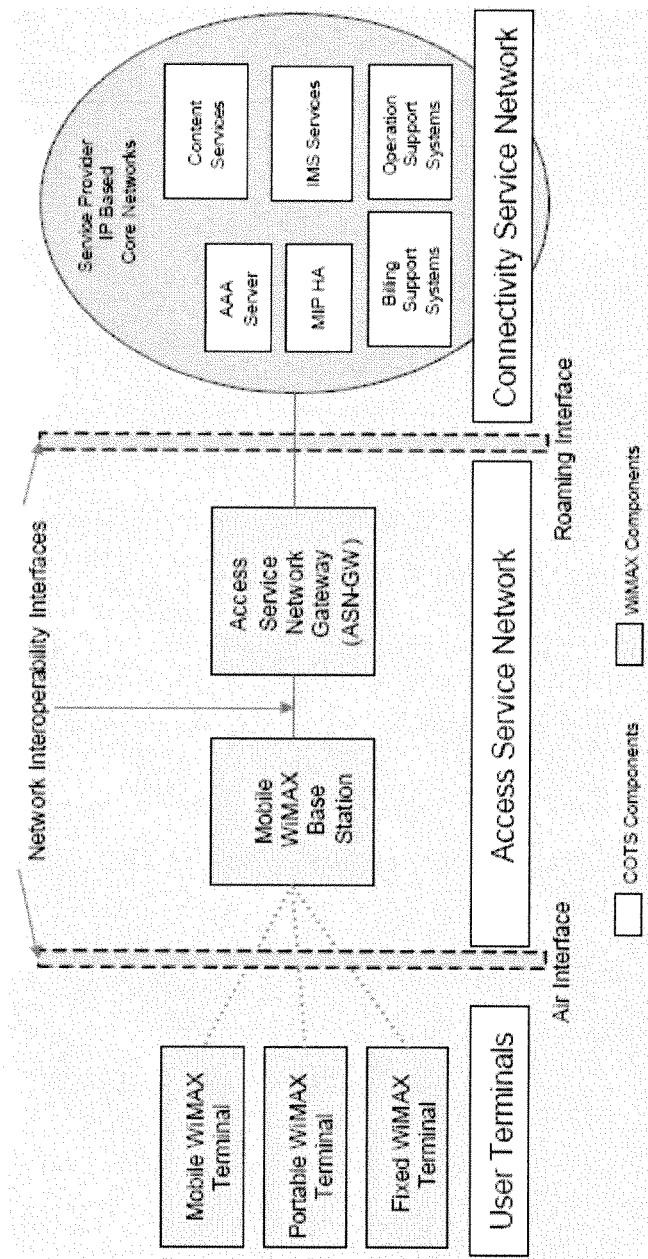
FIG. 4 shows a mobile WiMAX network architecture.

FIG. 4 shows the architecture of mobile WiMAX networks. The present invention specifies the user terminal positioning procedures through the air interface. These operations make use of MAC management messages defined in IEEE 802.16e-2005 standard. Positioning service can be regarded as one of the IMS services. It supposes the location computation server is one component for positioning service within WiMAX Connectivity Service Network (CSN).

As show in FIG. 4, the mobile WiMAX network architecture includes user terminals, an access service network, and a connectivity service network. The user terminals include a mobile WiMAX terminal, a portable WiMAX terminal, a fixed WiMAX terminal and the like. The connectivity service network includes a mobile WiMAX base station and an access service network gateway (ASN-GW). The mobile WiMAX base station and the ASN-GW interact each other through a network interoperability interface. The connectivity service networks are service provider IP based core networks, for example, including AAA server, mobile IP home agent (MIP HA), billing support systems, contents services, IMS services, operation support systems and the like. The user terminal and the mobile base station in the access service network interacts each other through the network interoperability interface such as an air interface. And the connectivity service network and the ASN-GW in the access service network interacts each other through the network interoperability interface such as a roaming network.

In this innovation, DPFD based URAD-TDoA scheme is proposed for mobile WiMAX positioning. And an URA approach is introduced to provide assistant data for TDoA when only two BSs are detected. Furthermore, neighbor information carried by MOB_NBR-ADV is adopted to decrease detection time for neighbor BSs' preamble.

Figure 5:
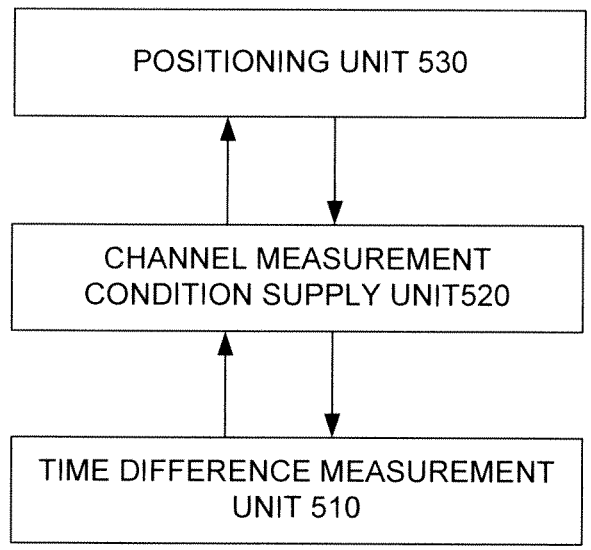
FIG. 5 shows the functional modules in proposed solution of the present invention.

As is shown FIG. 5, the positioning solution of the present invention is comprised of three functional modules: a time difference detection unit 510, a channel measuring condition supply unit 520 and a positioning unit 530. The time difference detection unit 510 in the PHY layer is the key part of the structure, which performs time difference detection in MSS. The time difference detection unit 510 performs uplink and downlink channel measurement according to the specified procedure. Uplink ranging is necessary for the case that only two BSs are detected including serving BS. The channel measurement condition supply unit 520 is in the MAC layer, for performing certain signaling and providing conditions (such as Idle Periods) for the channel measurement according to positioning request from positioning unit. The channel measuring condition supply unit 520 in the MAC layer performs certain signaling process to prepare for the channel measurement according to the positioning request from higher layer. For example, MSS will report the time difference between the serving BS and candidate BS to the positioning server located in the CSN by MOB_SCN-RSP. The positioning unit 530 in the application layer is the module to do position or optional velocity computation based on measurements. The positioning unit 530 includes location related applications and location computation servers, which chooses the proper algorithm and calculates, and then sends the results to the party who asked for this information. For example, the time difference detection unit 510 sent the measurement result to a remote positioning server (in the MAC layer) to calculate the position of the mobile user equipment. In most cases, positioning algorithm is embedded in the location computation server in CSN. In other cases, it is embedded in location related application of MSS. The communication among components in application layer (including location related application within MSS or application within CSN, and location computation server) can follow Mobile Positioning Protocol (MPP), which is out of scope of this innovation. In this innovation, it always assumes that a location computation server with positioning algorithm is a mandatory part for all positioning based services in mobile WiMAX. The URAD-TDoA scheme the present invention proposed for mobile WiMAX positioning can be divided into four steps: (1) downlink preamble fast detection (DPFD); (2) URA detection if there are less than three preambles detected in DPFD; (3) Measuring signaling using MAC management message; (4) Location calculation.

3) Mobile WiMAX Downlink Preamble Fast Detection (DPFD)

the mobile WiMAX downlink preamble fast detection (DPFD) will be illustrated in detail below. Firstly, MSS detects downlink preambles from BSs, all of which are synchronized by GPS in TDD mode mobile WiMAX. Then, the TDoA of different BSs' preamble can be gotten by preamble-based synchronization detection. Finally, the exact location can be calculated through classical TDoA algorithms (such as B. T. Fang, "Simple solutions for hyperbolic and related position fixes," IEEE Trans. Aerosp. Electron. Syst., vol. 26, pp. 748-753. September 1990 and Y. T. Chan, and K. C. Ho, "A Simple and Efficient Estimator for Hyperbolic Location", IEEE TRANSACTIONS ON SIGNAL PROCESSING, Vol. 42, No. 8, 1994, pp. 1905-1915, referred as Fang's and Chan's algorithms in the following).

Figure 6:
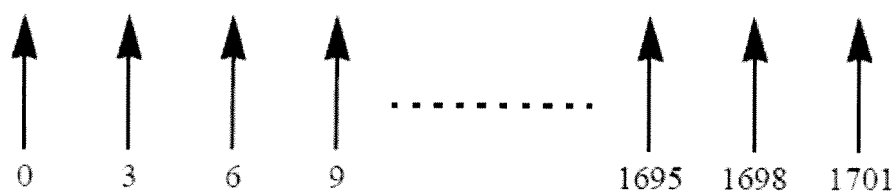
FIG. 6 shows the preamble structure for segment 0 in frequency domain.

The preamble designed for OFDMA PHY in IEEE 802.16e is modulated using a boosted BPSK modulation with a specific Pseudo-Noise (PN) code. Each segment uses each third subcarrier as a carrier-set for a preamble. Therefore, segment 0/1/2 uses preamble carrier-set 0/1/2. FIG. 6 shows the preamble structure for segment 0 in frequency domain.

Figure 7:
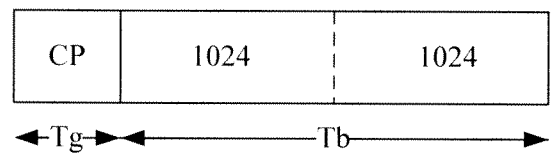
FIG. 7 shows the time domain structure for 2048 FFT size.

Accordingly, the preamble structure in time domain is conjugate symmetric structure. The time domain structure for 2048 FFT size is exemplified in FIG. 7.

Figure 8A:
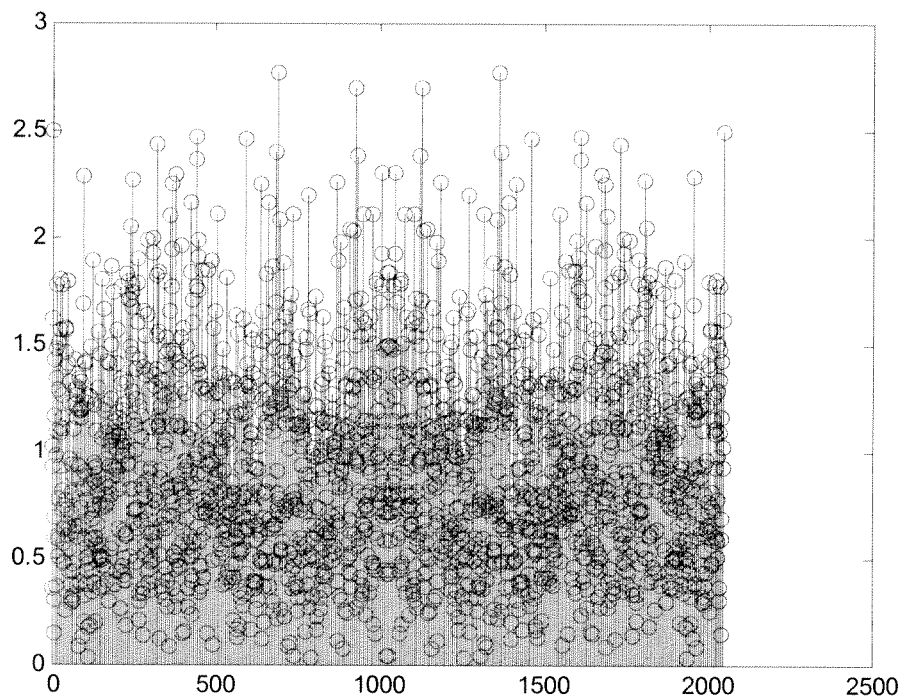
FIGS. 8a and 8b show the absolute magnitude value of preamble in time domain for 2048 FFT size and 128 FFT size, respectively.
Figure 8B:
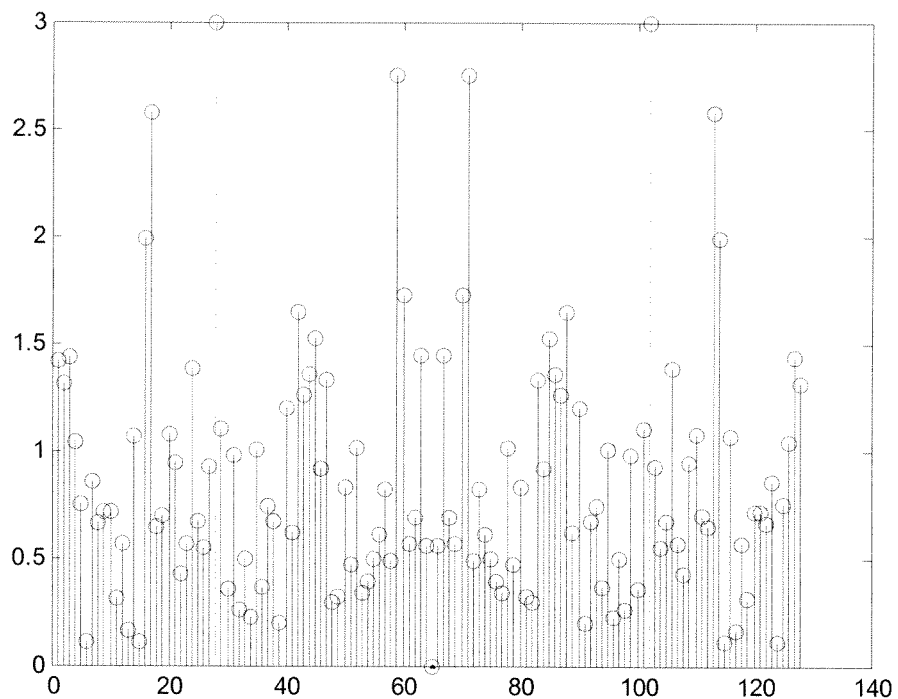

The absolute magnitude values of preamble in time domain for 2048 FFT size and 128 FFT size are shown in FIG. 8(a) and FIG. 8(b), respectively.

The frame synchronization algorithm used in the present invention is based on correlation parameters between repeating patterns in time domain. It is comprised of coarse timing estimation and fine timing estimation.

Figure 9A:
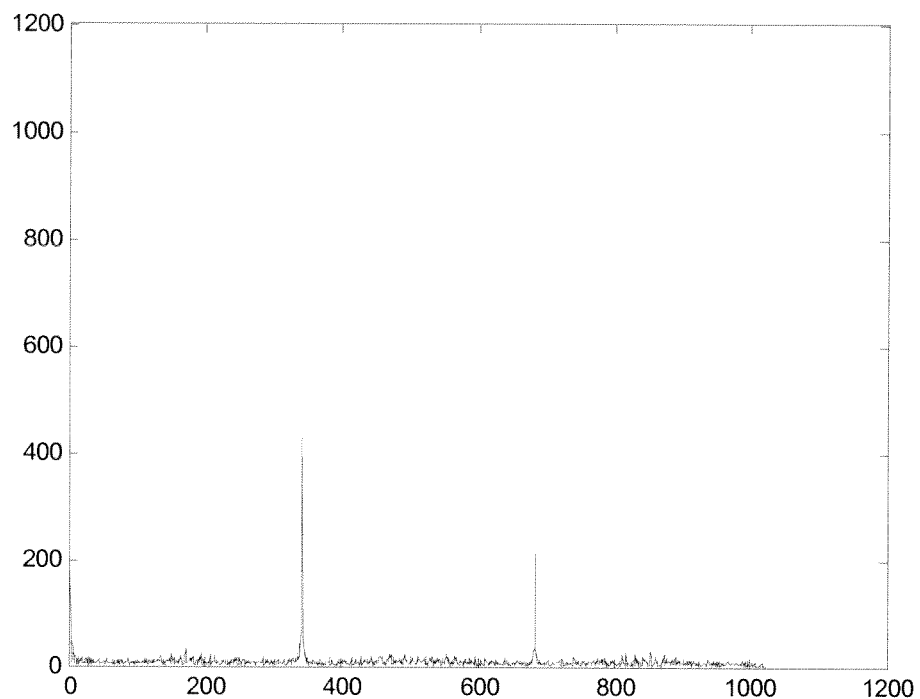
FIGS. 9a and 9b show the auto-correlation output for 2048 FFT size and the auto-correlation output for 128 FFT size, respectively.
Figure 9B:
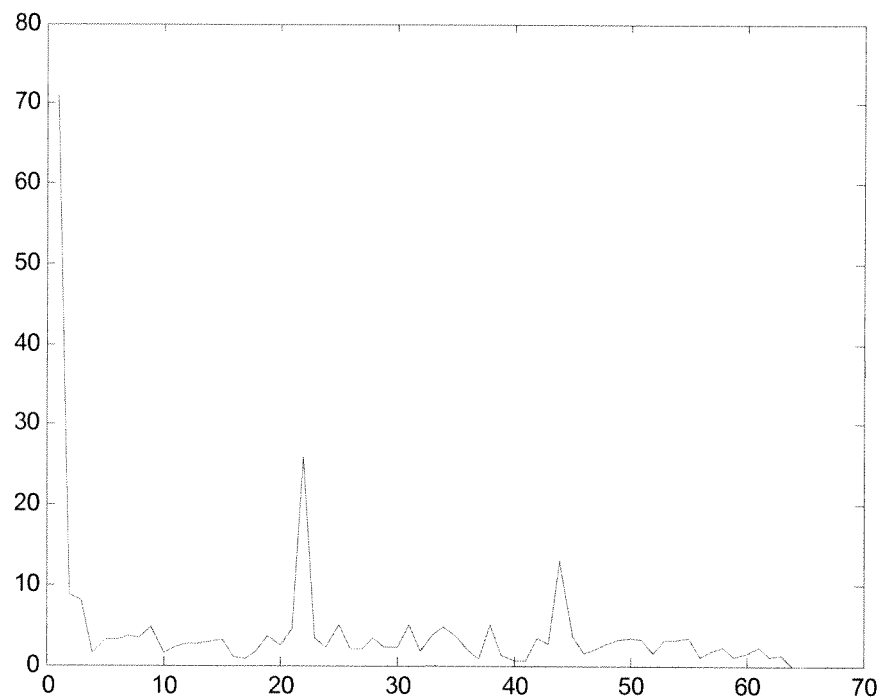

The coarse estimation step is based on auto-correlation between repeating parts within the preamble symbol. The coarse estimation of frame start point $\hat{n}_{coarse}$ can be defined as:

$$\hat{n}_{coarse} = \operatorname*{argmax}_{n}\left(\sum_{k=0}^{L-1} r_{n+k} r^*_{n+k+Nd}\right) \quad (1)$$

in which $r_n$ is the sampled received signal, $N_d$=L is the repeating length, which equals to the correlation window length. The auto-correlation output value is shown in FIG. 9, in which it can be seen the implicitly three times repeating characteristic within the symbol time. FIG. 9a shows the auto-correlation output for 2048 FFT size and FIG. 9b shows the auto-correlation output for 128 FFT size.

Figure 10A:
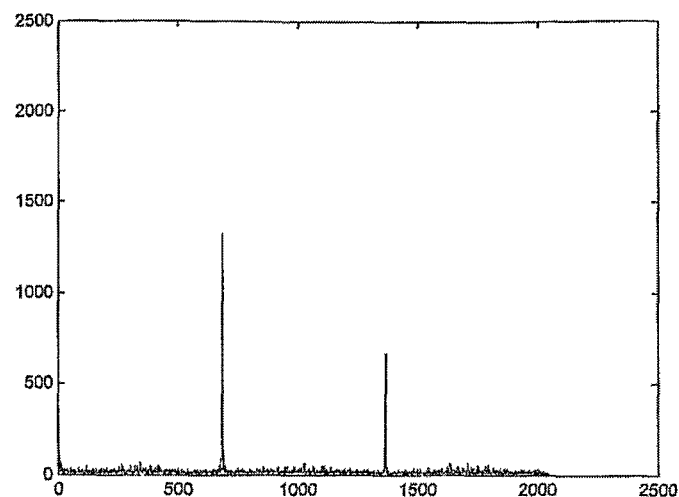
FIGS. 10a and 10b show the cross-correlation output values for different FFT size.
Figure 10B:
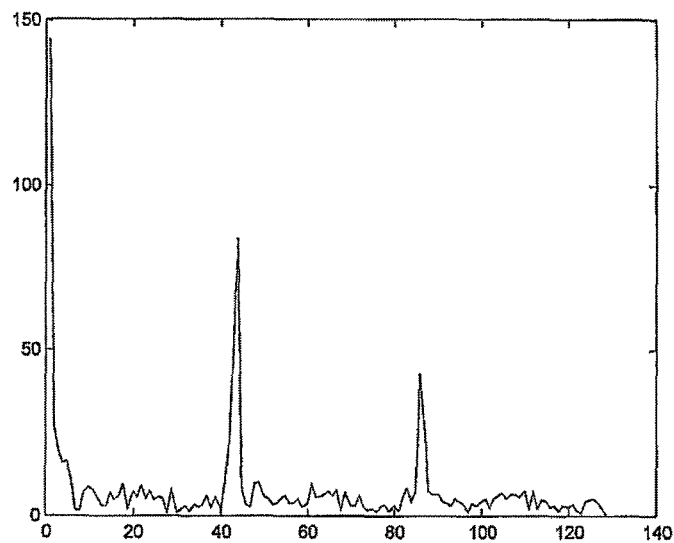

In the fine estimation step, the estimation of frame start point $\hat{n}_{fine}$ can be defined as:

$$\hat{n}_{fine} = \operatorname*{argmax}_{n}\left(\sum_{k=0}^{L-1} r_{n+k} c^*_{n+k}\right) \quad (2)$$

in which $c_n$ is the IFFT of local preamble. FIG. 10(a) and FIG. 10(b) show the cross-correlation output value for different FFT size.

Because the positioning service is initiated after the connection of the mobile station and the network, at that time the mobile station can obtain the preamble information of the neighboring cell from the MOB_NBR-ADV message broadcasted by the current service base station, and correlate with the preamble of the neighboring cell to perform position rapidly and save energy.

Figure 11:
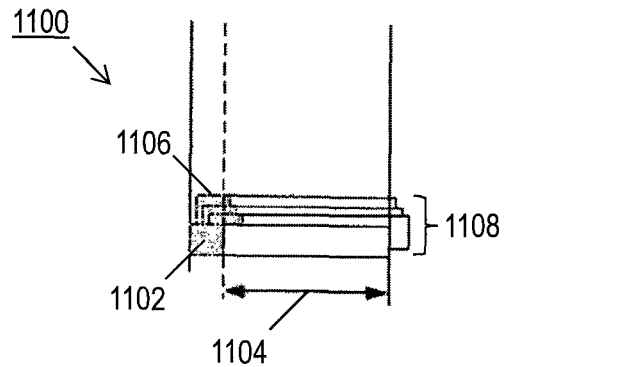
FIG. 11 shows the cross-correlation using moving window detection.

Moving-window based preamble detection 1100 can be used for TDoA detection. FIG. 11 shows the cross-correlation using moving window detection 1100. Referring to FIG. 11, the method comprises:

Moving a sample 1102 in time domain 1104;
FFT converting; and
Correlating with the neighbor BS preamble 1106 by the local candidate preamble series 1108.

For example, if there are four preambles and MSS has synchronized with the first preamble. Through the preamble correlation detection 1100 in the above three steps, the MSS can tell the time offset of the second preamble, and the third preamble in relation to the first preamble.

For MSS special for hard handoff in IEEE 802.16e, its PHY layer has no function to detect TDoA of preamble since there is no requirement in standard. However, its PHY layer has function to detect preamble and realize synchronization. So an enhancement function should be introduced into it. For MSS special for FBSS and Soft Handover (SHO), the standard has the definite requirement so that the TDoA measurements can be gotten.

Figure 12:
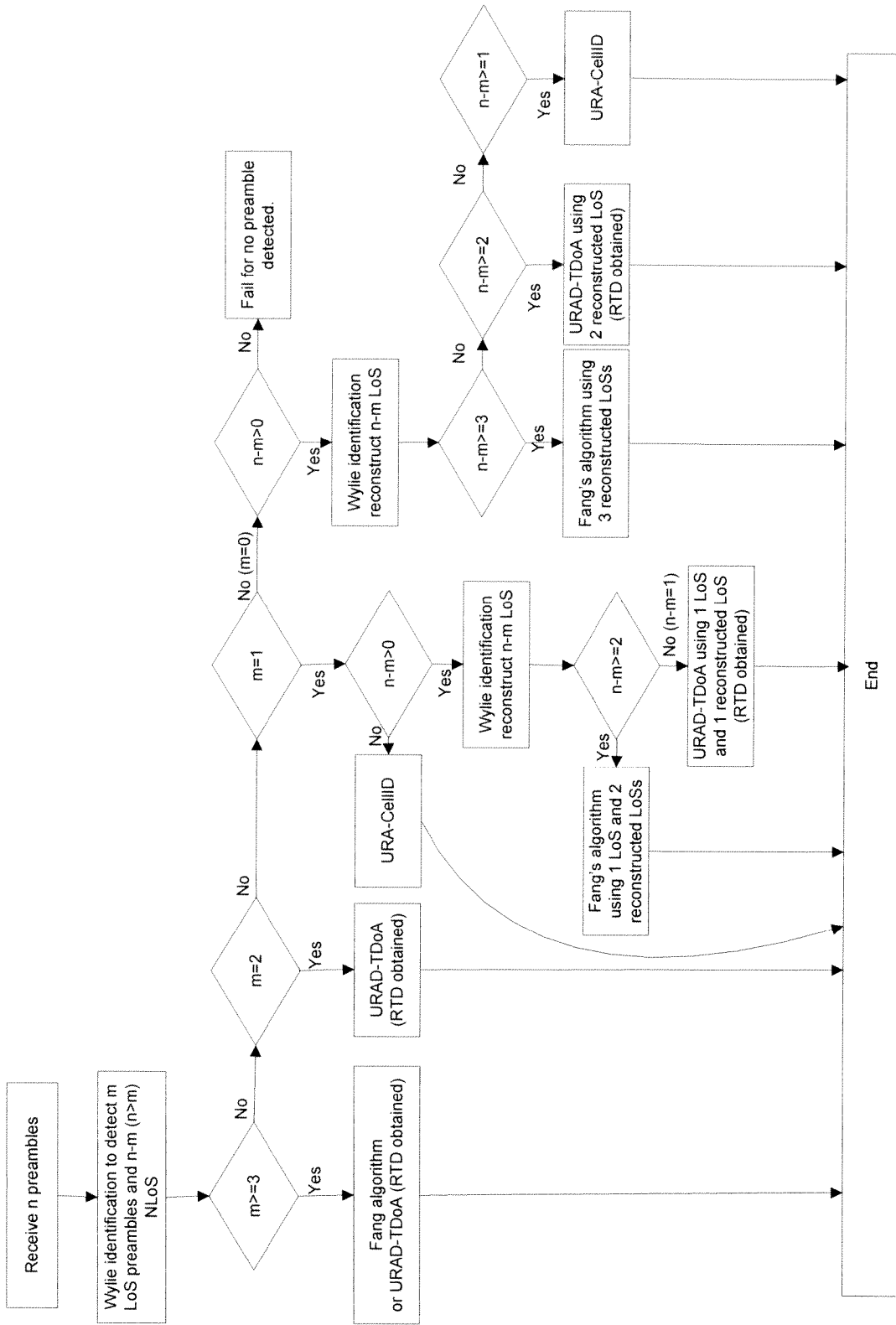
FIG. 12 shows the proposed mobile WiMAX positioning solution.

In some cases, all three preambles are LoS signals. Thus, Fang's algorithm can be operated because it only needs three preambles. Furthermore, Chan's algorithm can utilize more measurements to improve accuracy. But MSS may also receive non-line-of-sight (NLoS) signals. Hence, the present invention proposes a solution as shown in FIG. 12:

Receiving n Preambles;

Performing Wylie identification to detect m LoS preambles and (n−m) NLoS (n>m); If many NLoS preambles and no less than three LoS ones are detected, the present invention should use Wylie identification method to identify which signal is NLoS (cf.—M. P. Wylie and J. Holtzman, "The None-Line-of-Sight Problems in Mobile Location Estimation", WIN-LAB TR-121, June 1996, referred as Reference 3 in the following), and then it can use three other LoS signals to calculate location through Fang's algorithm. It can also use two LoS signals as well as uplink ranging information to calculate location through the present invention proposed URAD-TDoA approach.

If many NLoS preambles and two LoS ones are detected, it should use Wylie identification method to identify which signal is NLoS [Reference 3]. Then it can use two LoS signals as well as uplink ranging information to calculate location through proposed URAD-TDoA approach.

If many NLoS preambles and one LoS are detected, it should use Wylie identification method to identify which signal is LoS [cf. Reference 3]. Then it is determine whether (n−m) is larger than 0. If (n−m) is less than or equal to zero, the approach combining URA detection and cell-ID should be employed; otherwise, it should use Wylie method [cf. Reference 3] to reconstruct (n−m) LoS signals from NLoS signals. Then two or three LoS signals are available for location calculation using Fang's algorithm or URAD-TDoA approach.

If many NLoS preambles and none LoS are detected, the present invention should use Wylie identification method to identify all NLoS [cf. Reference 3]. Then the present invention should use Wylie method [cf. Reference 3] to reconstruct LoS signals from NLoS signals. Then LoS signals are available for location calculation referring to above algorithms.

If only one LoS preamble is detected or only one LoS preamble is reconstructed from NLoS signals, uplink ranging assistant cell/sector ID approach is suggested in this innovation.

4) Mobile WiMAX URAD-TDoA Approach for Two Preambles

When many cells constitute a network, the neighboring cell's preamble may be oblivion when the signal strength of the present cell is very strong. Therefore a "blind region" occurs and the detected preamble is reduced, resulting in that the region which may be positioned is reduced.

The present invention proposes a positioning method by employing only two preambles, which extends the region which may be positioned. But this approach also works well for three preamble scenarios.

In the URAD approach, the MSS should do ranging with the serving/anchor BS to get additional delay measurements for TDoA calculation. Hence, the location of the MSS is at the intersection of the hyperbola and the circle. In normal case, if only one RTD is given, there will be two possible roots. For cell/sector structure, the present invention can use the cell ID or sector ID information to choose one accurate root. However, in some cases (low probability to happen), the two roots may be in the same cell/sector. Thus it is difficult to determine which root should be discarded. In this innovation, it chooses the middle point {(x1+x2)/2, (y1+y2)/2} as the estimated position if such a low probability event happens, in which case (x1,y1) and (x2,y2) is the coordinates of the two possible roots.

Figure 13:
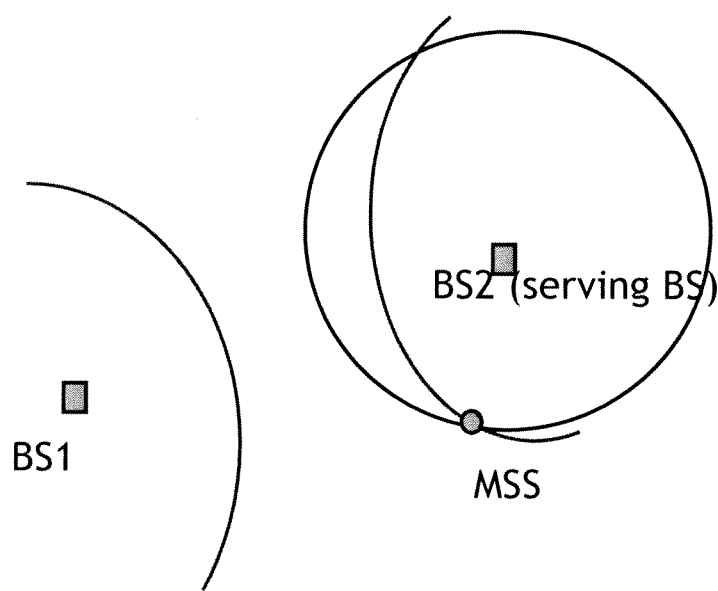
FIG. 13. shows the URAD-TDoA positioning approach using the service BS's TDoA information.

FIG. 13 shows the URAD-TDoA positioning method using service BS's TDoA information. Firstly, MS lies at the circle centered at the service base station BS2, whose radius is the distance between MSS and BS2. At the same time, MS lies at the hyperbolas with focus at the BS1 and BS2, whose foci is the constant difference between the MSS and BS1 or BS2, respectively. Therefore, the MSS must lie in the intersections of the circle and the hyperbola as shown in the right side of FIG. 13. The two intersections may be selected by the assistance from cell-ID or sector ID for seeking the correct root. Otherwise, the average value of the coordinates of the two roots is selected as the location of the MSS according to the method of the present invention.

Figure 14:
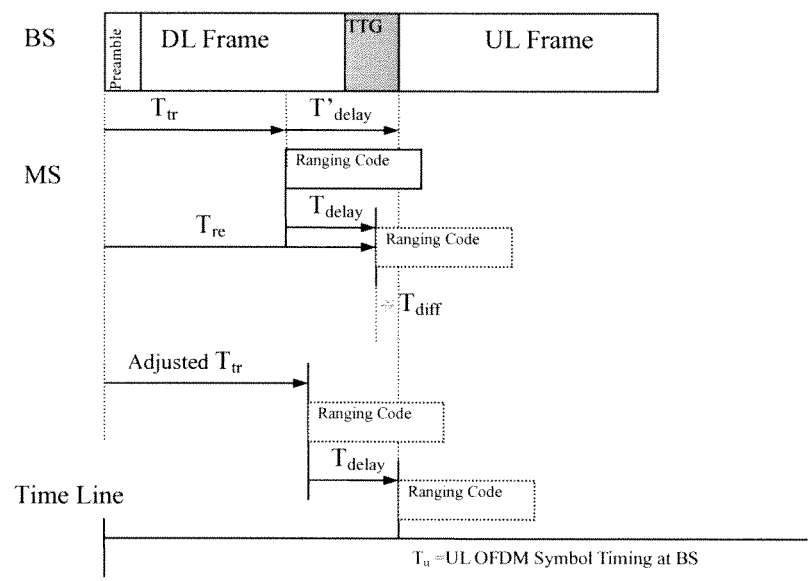
FIG. 14 shows the ranging procedure.

The ranging procedure is shown in FIG. 14. After acquiring downlink synchronization and uplink transmission parameters, the MSS transmits randomly selected Ranging code in a randomly selected Ranging Slot from available Ranging Region. After the BS receives the Ranging Code, it will send RNG-RSP with Time Corrections. Simultaneously, the delay measurement will be gotten.

The transmitting time for MS' Ranging Code $T_{tr}$ is defined at BS:

$$T_{tr} = T_{full} - T'_{delay} \quad (3)$$

in which $T_{full}$ is the time interval from DL frame start point to UL frame start point at BS. $T'_{delay}$ is the Ranging Code's UL propagation delay BS considered.

The arrival time $T_{re}$ for MS' Ranging Code is:

$$T_{re} = T_{tr} + T_{delay} \quad (4)$$

in which $T_{delay}$ is the Ranging Code's real UL propagation delay.

The time difference $T_{diff}$ can be gotten at BS:

$$\begin{aligned} T_{diff} &= T_{full} - T_{re} \quad (5)\\ &= (T_{tr} + T'_{delay}) - (T_{tr} + T_{delay})\\ &= T'_{delay} - T_{delay}\end{aligned}$$

According to $T_{diff}$, BS can adjust $T_{tr}$ for MS' Ranging Code. Finally, the Ranging Code will arrive at the UL frame start point at BS. And the estimated UL propagation delay $T'_{delay}$ will be equal to the real delay $T_{delay}$.

Let $T_u$ be the uplink OFDM symbol timing at the BS, $T_d$ be the downlink OFDM symbol timing at the BS, then the single trip delay for uplink ranging is:

$$T_{delay} = T_u - T_d - T_{tr} - T_{diff} \quad (6)$$

More accurate delay measurement can be achieved after ranging process is completed ($T_{diff}=0$). At that time, then the single trip delay for uplink ranging will be:

$$T_{delay} = T_u - T_d - T_{tr} \quad (7)$$

From above analysis, it can be seen that the single/round trip delay can be obtained by BS when either initial ranging or periodical ranging happens. Therefore, the BS may store such a delay (latest updated value) in its memory and send it to the location computation server along with the one time offset when two preambles are detected in MSS.

Figure 15:
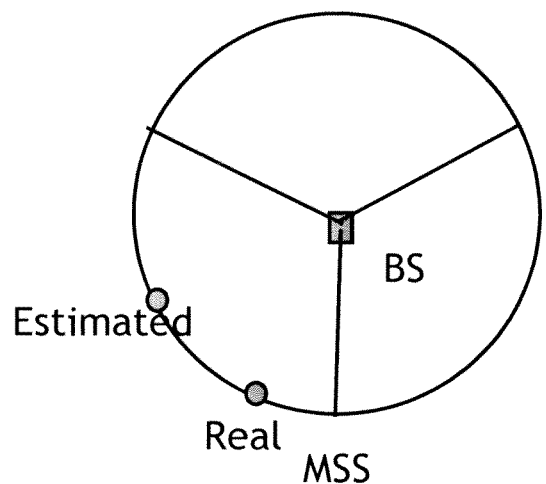
FIG. 15 shows the URA-Cell-ID Approach.

5) Mobile WiMAX URA-Cell-ID United Approach for Detecting Only One Single Preamble For those cases that only one LOS preamble is detected, we use ranging information to obtain a circle whose diameter is the RTD and the center of which is BS, in which RTD is the distance from BS to MSS. Then cell ID and sector ID can be used to assist positioning. The middle of the arc in the sector will be used as the estimated positioning, seeing FIG. 15 for reference.

6) Mobile WiMAX MAC Message Flowchart for URAD-TDoA

MAC management messages such as MOB_NBR-ADV, MOB_SCN-REQ, MOB_SCN-RSP and MOB_SCN-REP are utilized in the proposed URAD-TDoA of the present invention. Because all the MAC messages used for delivering the measurement results in this solution are defined in the IEEE 802.16e standard, and the present invention uses them just in the way they should be used.

The present invention also proposes some messages added to the CSN side for positioning service initiation request and result report to complete the whole process of a positioning service procedure, such as LOC_REQ, LOC_RSP, to LOC_ENQ.

There are numerous positioning techniques that can be considered in wireless position location systems. Such techniques can be broadly classified into two categories: (1) Location computation in the network; (2) Location Computation in the User Terminal. URAD-TDOA scheme proposed by the present invention also has the two categories.

6.1) Location Computation in the Network

This type of positioning technique has no modification in the existing handsets.

6.1.1) Network Initiated Positioning

Figure 16:
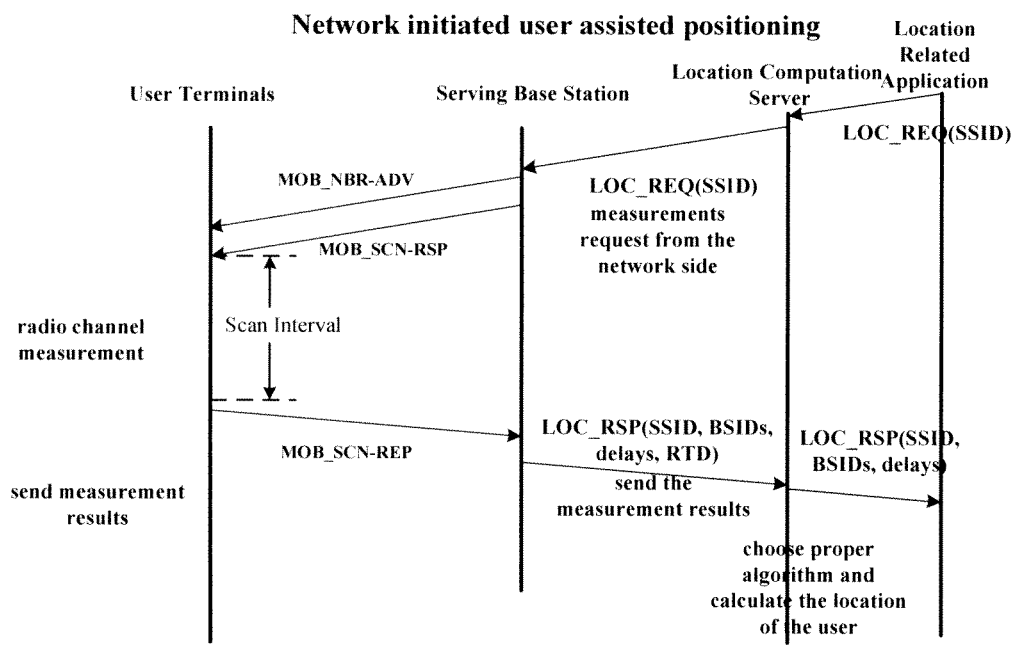
FIG. 16 shows the network initiated user assistant positioning.

The network initiated positioning signaling flowchart is shown as FIG. 16. The location related application in CSN invokes positioning by the position-related application transmitting LOC_REQ message to location computation server. The LOC_REQ message contains SSID (the positioning target MSS ID). The location computation server executes the location request and forwards request to the serving BS. After receiving the request, the serving BS will send MOB_NBR-ADV to tell MSS the number of neighbors and their BS IDs. Then the serving BS will send MOB_SCN-RSP to the user terminal to indicate the starting and ending frame for the scanning. Serving BS should also negotiate the scanning interval with neighbors for MSS scanning.

The MSS may actively make certain measurements and send results to the serving BS via MOB_SCN-REP when Trigger Action is 0x5 or 0x6 in DCD message. Here, the MSS may also take advantage of the MOB_NBR-ADV message sent by its serving BS to decrease the scanning interval by using the number of neighbors and their BS IDs in MOB_NBR-ADV messages.

Message format of MOB_SCN-REP is shown in Tab.109j of IEEE 802.16 TGe, "Part 16: Airinterface to fixed and mobile broadband wireless access systems, Amendment 2" IEEE 802.16e, December 2005. Whether or not to report the measurement delay between the neighbor BS and the serving BS will be indicated in the field of Report Metric (Bit 2). MOB_SCN-REP also includes round trip delay (RTD) information which is indicated in the field of Report Metric (Bit 3). However, IEEE802.16e doesn't provide a feasible solution to obtain these values in MSS. In this innovation, the present invention has shown two possible solutions in PHY layer for relative delay as well as RTT.

The serving BS will use the LOC_RSP message to forward the location measurement information and RTD to location computation server. The LOC_RSP message contains (SSID, BSIDs, delays, RTD), in which BSIDs are the neighbor BS ID and the serving BS ID, and delays are the TDoA measurements. The location computation server selects a proper arithmetic and computes the location of users, sends the location related application by LOC-RSP to thereby finish the network initiated user assistant positioning.

6.1.2) User Initiated Positioning

Figures 17, 18:
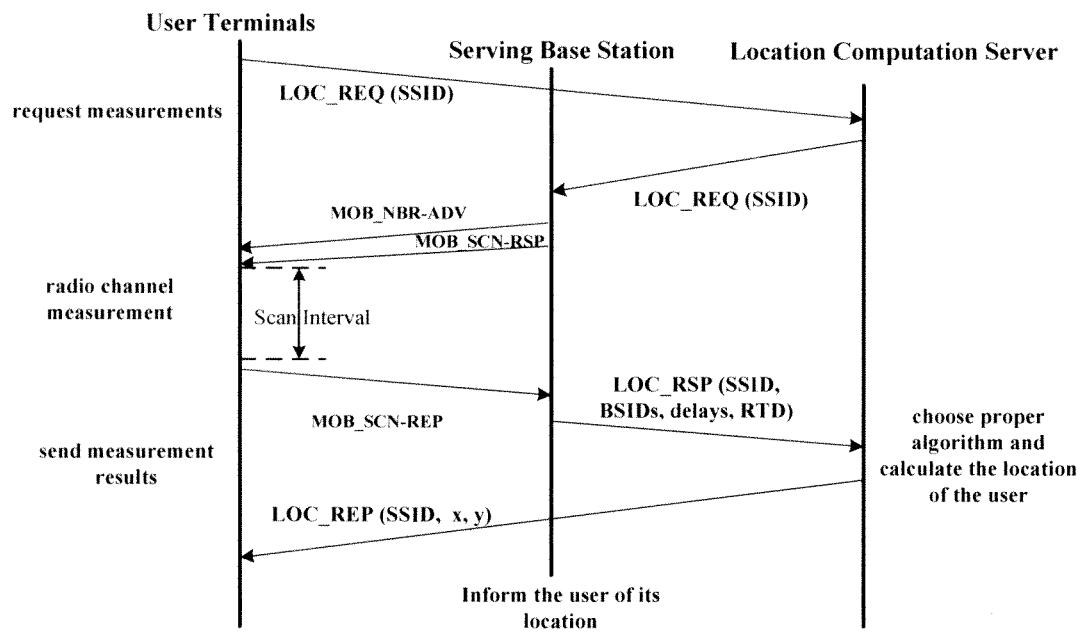
FIG. 17 shows the user initiated user assistant positioning.
FIG. 18 shows the network initiated network assistant positioning.

The user initiated positioning signaling flowchart is shown as FIG. 17. The application in user terminal sends the LOC_REQ message to the location management server with its own SSID to request measurement. The location computation server will enquiry the serving BS for triggering positioning measurement. The serving base station sends MOB_NBR-ADV and MOB SON-REP to user terminal for performing radio channel measurement, and after a certain scan interval it receives location measurement information MOB_SCN-REP. Thereafter, the serving BS will forward the parameters in a LOC_RSP (SSID, BSID, delay, RTD) message to the location computation server for computing location. The location computation sever chooses proper algorithm, calculates the location of the user. The computation results will be sent back to the user terminal using LOC_REP message, which contains its SSID and its location (x, y). The location computation server informs the user of it's location.

6.2) Location Computation in the User Terminal

This type of positioning technique requires a software application running on the existing handsets, which is responsible for calculating the location as well as displaying the location in the background map.

The location can also be calculated by some applications embedded in the user terminal equipment. And some auxiliary information may also be needed, such as the location of the neighbor BSs and so on. The network and terminal initiated network assistant positioning signaling flowcharts are shown as FIG. 18 and FIG. 19 respectively.

FIG. 18 shows the flow chart of the Network initiated network assistant positioning method. The location related application sends the location measurement request to the location computation server through LOC_REQ(SSID). The location computation server forwards the measurements request form the network side to the serving base station. The serving base station sends the MOB_NBR-ADV and MOB_SCN-RSP messages to the user terminals. The user terminals perform radio channel measurement and choose proper algorithm to calculate the location of the user after a scan interval. And the user terminals calculate the location of the user after a location computation interval and send the location of the user to the location related application through the LOC_REP (SSID, x, y).

Figure 19:
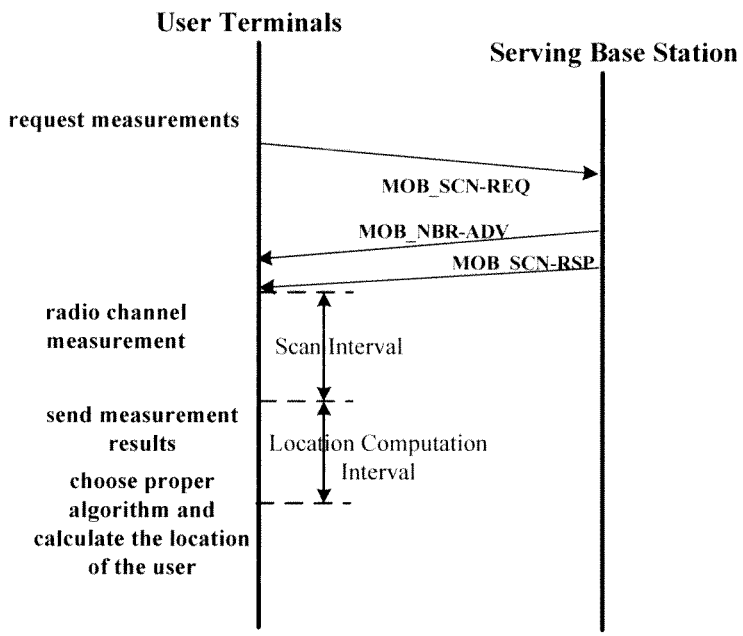
FIG. 19 shows the user initiated network assistant positioning.

FIG. 19 shows the flow chart of the user terminal initiated network assistant positioning method. The user terminals send the MOB_SCN-REQ message to the serving base station for requesting measurement. The serving base station sends to MOB_NBR-ADV and MOB_SCN-RSP to the user. The user terminals perform radio channel measurement and send measurement results after a certain scan interval, and choose proper algorithm and calculate the location of the user.

Performance Comparison

Figure 20:
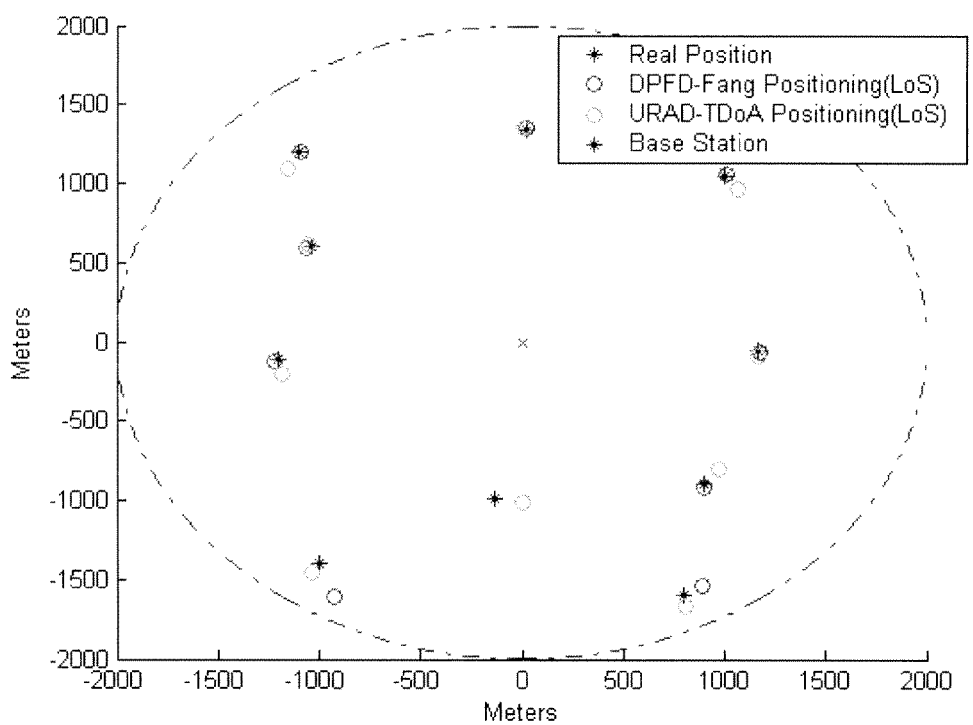
FIG. 20 shows the performance comparison between the DPFD using the Fang's algorithm and the URAD-TDoA in the circumstance of LoS.

Performance comparison of DPFD using Fang's algorithm and URAD-TDoA in LoS environment is shown in FIG. 20. For LoS, AWGN channel is assumed. The present invention shows that the URAD-TDoA nearly has the same performance to that of DPFD-Fang. But DPFD-Fang doesn't work for two preamble cases.

Figure 21:
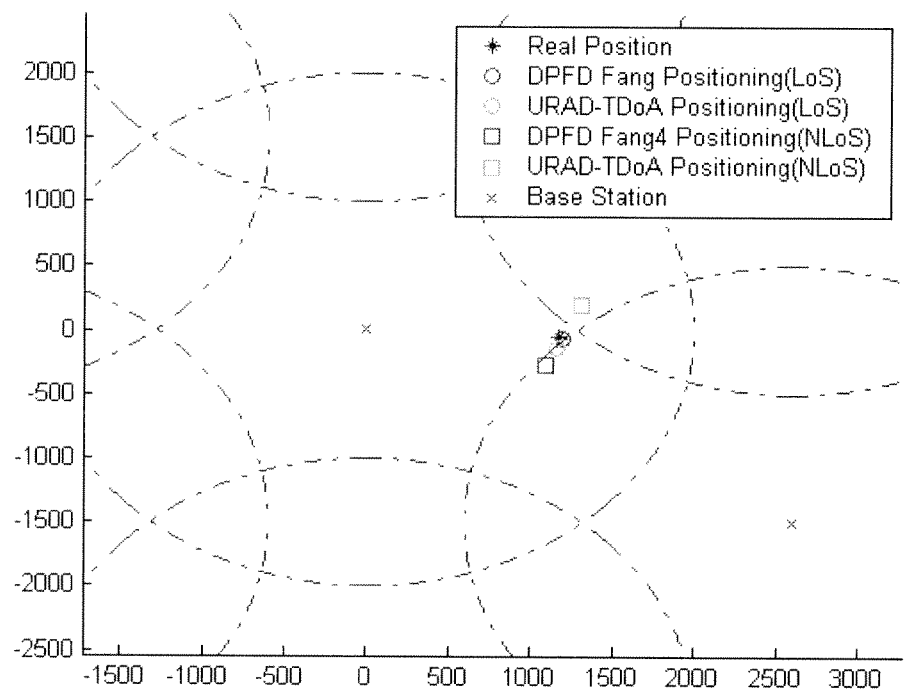
FIG. 21 shows comparing examples of different position approaches.
Figure 21:
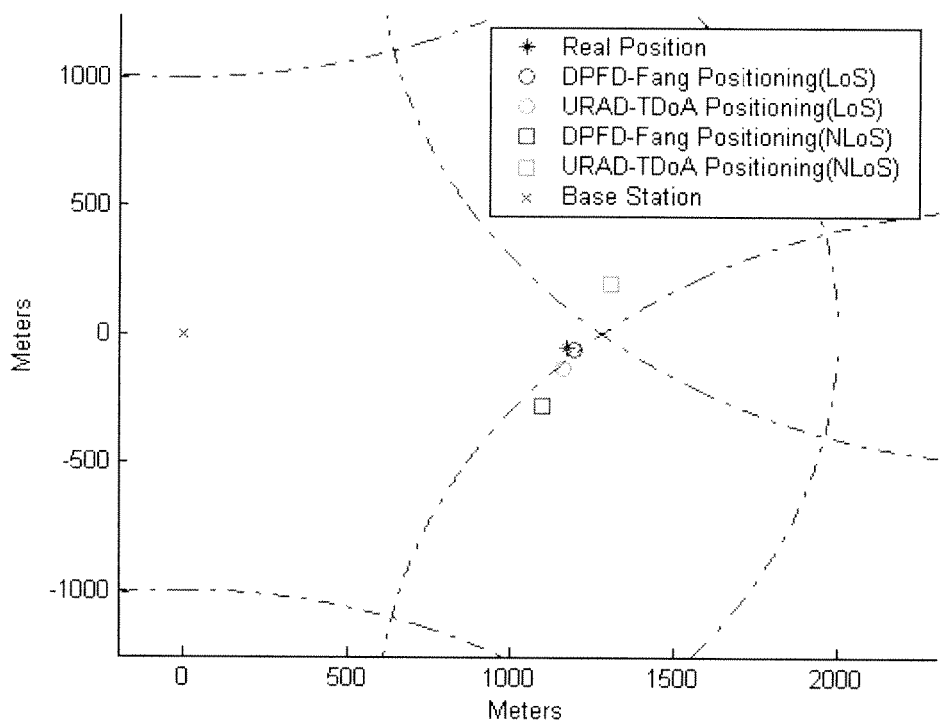

FIG. 21 shows an example of performance comparison of different positioning approach. It assumes a multipath environment. For LoS approach, the LoS can be either directly detected or reconstructed. For NLoS approach, we assume that the NLoS signal is directly used by positioning algorithms.

For NLoS, The cost 259 (typical Urban) channel model is assumed. Normalized Doppler Frequency: 50 hz/10 Mhz=$5*10^{-6}$. NLOS error follows the exponential distribution, the mean of which is 300 meters.

Generally, it can be seen that for LoS, DPFD-Fang's algorithm can provide a good estimation for positioning. The proposed URAD-TDoA does provide a feasible solution for two preamble detection. But it is not so accurate as that of DPFD-Fang's solution especially for NLoS cases. NLOS error will influence the accuracy a great deal. Therefore, to reconstruct the real LoS signal is very important.

CONCLUSION

IEEE802.16 TGe "Part 16: Airinterface to fixed and mobile broadband wireless access systems, Amendment 2" IEEE 802.16e, December 2005 doesn't provide a novel and feasible URAD-TDoA solution for positioning applications. This invention proposes a novel URAD-TDoA method for mobile WiMAX positioning. This scheme is based on Downlink Preamble Fast Detection (DPFD) especially when no less than three preambles are detected. And an Uplink Ranging Assistant (URA) approach is introduced to provide assistant data to TDoA when only two BS' preambles are detected. The present invention further shows that the accuracy of URAD-TDoA for LoS application is almost the same as that of Fang's in AWGN channel. Although URAD-TDoA also works if more than two preambles are detected, it is not so accurate compared with that of DPFD-Fang using three preambles especially for NLoS environment.

Although IEEE802.16e has defined a MAC message called MOB_SCN-REP to carry relative time delay as well as round trip delay, it doesn't show how to obtain these values in PHY layer. This invention also provides solutions for detecting both parameters, which is essential for WiMAX positioning algorithms.

The present invention also proposes to use neighbor information carried by MOB_NBR-ADV to decrease the neighbor BSs' preamble detection time. By this research, the proposed URAD-TDoA scheme can efficiently accomplish positioning application and provide a feasible solution for WiMAX positioning.

Commercial Worthiness

Positioning can make a mobile device either gather the information about its position or provide the accurate particular location. This technology brings forward many novel concepts and services, including location-sensitive billing, fleet tracking, package and personal tracking, mobile yellow pages, location-based messaging, route guidance, and providing traffic information. Positioning has already been applied in GSM and 3G networks, and it will be one of the most promising and important features of the next generation wireless systems.

The present invention is total based on the IEEE 802.16e standard, and can be easily applied to the existing mobile WiMAX apparatus.

Although the object, technical solution and the availability of the present invention is illustrated with reference to the preferred embodiments thereof, it can be understood by those skilled in the art that various changes, substitutions and alters to the present invention are possible without departing from the spirit and scope of the present invention. Therefore, the present invention is not limited to the above embodiments but only limited by the following claims and the equivalents thereof.

What is claimed is:

1. A method for WiMAX positioning a mobile user station (MSS), comprising:
    detecting downlink preambles from a serving base station (BS) and at least one neighboring BS at an MSS, wherein the downlink preambles are synchronized in a time-division duplex (TDD) mode for mobile WiMAX;
    determining a time difference of arrival (TDoA) for at least one neighboring BS in relation to the serving BS through preamble-based synchronization detection based at least in part on the received downlink preambles and the TDD mode synchronization;
    obtaining ranging information for the MSS in relation to the serving BS in conjunction with a ranging procedure; and
    calculating a location for the MSS based at least in part on the determined TDoA and the obtained ranging information using a select positioning algorithm.

2. The method as claimed in claim 1, wherein if at least two preambles were detected, an Uplink Ranging Assistant Detection (URAD) approach is used to obtain the ranging information to provide assistant data for the positioning algorithm to use with the determined TDoA to calculate the location of the MSS.

3. The method as claimed in claim 1 wherein the determined TDoA is associated with possible locations of the MSS along hyperbolas with foci at the serving BS and the corresponding neighboring BS, wherein the ranging information includes a round trip delay (RTD) that is associated with possible locations of the MSS along a circle centered at the serving BS, wherein the obtained ranging information in combination with the determined TDoA reduces the possible locations of the MSS to two points at which the circle and corresponding hyperbola intersect, the method further comprising:
    obtaining cell ID or sector ID information associated with the serving BS and the obtained ranging information;
    wherein the select positioning algorithm uses the determined TDoA, obtained ranging information, and obtained cell ID or sector ID information to calculate the location for the MSS.

4. The method as claimed in claim 3, wherein, if only one of the points of intersection is inside a cell/sector of the serving BS associated with the cell ID or sector ID information, the calculated location for the MSS is based at least in part on the point of intersection inside the corresponding cell/sector.

5. The method as claimed in claim 3, wherein, if both of the two points of intersection are inside a cell/sector of the serving BS associated with the cell ID or sector ID information, the calculated location for the MSS is based at least in part on an estimate of a middle point between the two points of intersection.

6. The method as claimed in claim 1, wherein, in conjunction with the ranging procedure, the MSS transmits a randomly selected Ranging Code in a randomly selected Ranging Slot from an available Ranging Region.

7. The method as claimed in claim 6 wherein, after the serving BS receives the Ranging Code, the serving BS sends a RNG-RSP message with the ranging information, including Time Corrections, to the MSS.

8. The method as claimed in claim 1, wherein the ranging information includes a single/round trip delay and the ranging procedure includes at least one of initial ranging and periodical ranging.

9. The method as claimed in claim 1, wherein the preamble-based synchronization detection includes a moving-window based preamble detection in conjunction with determining the TDoA for the neighboring BS in relation to the serving BS for the corresponding detected preamble.

10. The method as claimed in claim 9, wherein the moving-window based preamble detection comprises:
    moving a sample window length in relation to a local candidate preamble series;
    FFT converting the sample window length; and
    correlating the sample window length with at least one neighbor preamble in relation to the local candidate preamble series.

11. The method as claimed in claim 1, further comprising:
    distinguishing the detected downlink preambles between line of sight (LoS) preambles and non-LOS (NLoS) preambles and using a Wylie NLoS identification method; and
    if two LoS preambles are identified, selecting the corresponding two LoS preambles to determine the TDoA for the corresponding neighboring BS in relation to the serving BS.

12. The method as claimed in claim 11, further comprising:
    if only one LoS preamble is identified and at least one NLoS preamble is identified, reconstructing one or more NLoS preamble to form a corresponding one or more LoS preamble using a Wylie LoS reconstruction method; and selecting the identified LoS preamble and the corresponding reconstructed LoS preamble to determine the TDoA for the corresponding neighboring BS in relation to the serving BS.

13. The method as claimed in claim 11 wherein, the obtained ranging information is associated with possible locations of the MSS along a circle centered at the serving BS, the method further comprising:

obtaining cell ID or sector ID information associated with the serving BS and the obtained ranging information to assist in positioning the MSS.

14. The method as claimed in claim 13, wherein, if only one LoS preamble is identified and no NLoS preamble is identified or, if no LoS preamble is identified and only one or no NLoS preamble is identified, the select positioning algorithm uses the obtained ranging information and obtained cell ID or sector ID information to calculate the location for the user terminal such that the calculated location for the user terminal is based at least in part on an estimate of a middle point of an arc of the circle that intersects a cell/sector of the serving BS associated with the cell ID or sector ID information.

15. A method for positioning a WiMAX user terminal, comprising:

detecting downlink preambles from a first base station (BS) and at least one neighboring BS at a user terminal in conjunction with the user terminal performing a scan interval, wherein the BSs are associated with a WiMAX access service network and the downlink preambles are synchronized in a time-division duplex (TDD) mode for WiMAX communications;

determining a time difference of arrival (TDoA) for at least one neighboring BS in relation to the first BS through preamble-based synchronization detection based at least in part on the received downlink preambles and the TDD mode synchronization;

obtaining ranging information for the user terminal in relation to the first BS in conjunction with a ranging procedure; and calculating a location for the user terminal based at least in part on the determined TDoA and the obtained ranging information using a select positioning algorithm.

16. The method as claimed in claim 15 wherein the determined TDoA is associated with possible locations of the user terminal along hyperbolas with foci at the first BS and the corresponding neighboring BS, wherein the obtained ranging information is associated with possible locations of the user terminal along a circle centered at the first BS, wherein the obtained ranging information in combination with the determined TDoA reduces the possible locations of the user terminal to two points at which the circle and corresponding hyperbola intersect, the method further comprising:

obtaining cell ID or sector ID information associated with the first BS and the obtained ranging information;

wherein the select positioning algorithm uses the determined TDoA, obtained ranging information, and obtained cell ID or sector ID information to calculate the location for the user terminal.

17. The method as claimed in claim 16 wherein, if only one of the two points of intersection is inside a cell/sector of the first BS associated with the cell ID or sector ID information, the calculated location for the user terminal is based at least in part on the point of intersection inside the corresponding cell/sector.

18. The method as claimed in claim 16 wherein, if both of the two points of intersection are inside a cell/sector of the first BS associated with the cell ID or sector ID information, the calculated location for the user terminal is based at least in part on an estimate of a middle point between the two points of intersection.

19. The method as claimed in claim 15, further comprising:

distinguishing the detected downlink preambles between line of sight (LoS) preambles and non-LOS (NLoS) preambles using a Wylie NLoS identification method; and if two LoS preambles are identified, selecting the corresponding two LoS preambles to determine the TDoA for the corresponding neighboring BS in relation to the first BS.

20. The method as claimed in claim 19, further comprising:

if only one LoS preamble is identified and at least one NLoS preamble is identified, reconstructing one or more NLoS preamble to form a corresponding one or more LoS preamble using a Wylie LoS reconstruction method; and selecting the identified LoS preamble and the corresponding reconstructed LoS preamble to determine the TDoA for the corresponding neighboring BS in relation to the first BS.

21. The method as claimed in claim 19, further comprising:

if no LoS preamble is identified and at least two NLoS preambles are identified, reconstructing two or more NLoS preambles to form a corresponding two or more LoS preambles using a Wylie LoS reconstruction method; and selecting the corresponding two reconstructed LoS preambles to determine the TDoA for the corresponding neighboring BS in relation to the first BS.

22. The method as claimed in claim 19 wherein the obtained ranging information is associated with possible locations of the user terminal along a circle centered at the first BS, the method further comprising:

obtaining cell ID or sector ID information associated with the first BS and the obtained ranging information;

wherein, if only one LoS preamble is identified and no NLoS preamble is identified or, if no LoS preamble is identified and only one or no NLoS preamble is identified, the select positioning algorithm uses the obtained ranging information and obtained cell ID or sector ID information to calculate the location for the user terminal such that the calculated location for the user terminal is based at least in part on an estimate of a middle point of an arc of the circle that intersects a cell/sector of the first BS associated with the cell ID or sector ID information.

23. The method as claimed in claim 15 wherein the first BS is a serving BS to the user terminal in relation to the determined TDoA and the obtained ranging information.

* * * * *